United States Patent
Yamashita

(10) Patent No.: US 11,365,268 B2
(45) Date of Patent: Jun. 21, 2022

(54) METHOD FOR PRODUCING POLYVINYL ALCOHOL

(71) Applicant: DENKA COMPANY LIMITED, Tokyo (JP)

(72) Inventor: Akihiro Yamashita, Niigata (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 17/057,556

(22) PCT Filed: Jul. 3, 2019

(86) PCT No.: PCT/JP2019/026528
§ 371 (c)(1),
(2) Date: Nov. 20, 2020

(87) PCT Pub. No.: WO2020/022016
PCT Pub. Date: Jan. 30, 2020

(65) Prior Publication Data
US 2021/0189028 A1    Jun. 24, 2021

(30) Foreign Application Priority Data
Jul. 27, 2018  (JP) ................... 2018-141717

(51) Int. Cl.
   *C08F 18/04*         (2006.01)
(52) U.S. Cl.
   CPC ................... *C08F 18/04* (2013.01)
(58) Field of Classification Search
   CPC ....................................................... C08F 18/04
   See application file for complete search history.

(56) References Cited

U.S. PATENT DOCUMENTS

| 4,818,787 | A | 4/1989 | Sato et al. |
| 4,818,788 | A | 4/1989 | Sato et al. |
| 2017/0226247 | A1 | 8/2017 | Kumaki et al. |
| 2017/0335030 | A1 | 11/2017 | Fukuhara |

FOREIGN PATENT DOCUMENTS

| JP | 60190223 | A | 9/1985 |
| JP | 61148209 | A | 7/1986 |
| JP | 6337106 | A | 2/1988 |
| JP | 63284206 | A | 11/1988 |
| JP | 03287630 | A | 12/1991 |
| JP | 03287631 | A | 12/1991 |
| JP | 05117307 | A | 5/1993 |
| JP | 2009108218 | A | 5/2009 |
| JP | 2010202840 | A * | 9/2010 |
| JP | 2010202840 | A | 9/2010 |
| JP | 2013177646 | A * | 9/2013 |
| JP | 2013177646 | A | 9/2013 |
| JP | 2015187215 | A | 10/2015 |
| WO | 9955797 | A1 | 11/1999 |
| WO | WO-9955797 | A1 * | 11/1999 ............. C09K 15/18 |
| WO | 2016060241 | A1 | 4/2016 |
| WO | 2016076349 | A1 | 5/2016 |

OTHER PUBLICATIONS

English-language abstract of JP03287630 (1991).
English-language abstract of JP03287631 (1991).
English-language abstract of JP05117307 (1993).
English-language abstract of JP60190223 (1985).
English-language abstract of JP63284206 (1988).
English-language abstract of JP2009108218 (2009).
English-language abstract of JP2013177646 (2013).
English-language abstract of JP2015187215 (2015).
International Search Report for PCT/JP2019/026528 dated Aug. 20, 2019.
Nagano et al., "Poval", Polymer Publishing Association, Revised New Edition, pp. 105-107 (1981).
Machine English Translation of WO 9955797 A1 (1999).
Machine English Translation of JP 2010202840 A (2010).
Extended European Search Report from corresponding EP 19842302.2 dated Aug. 11, 2021.

* cited by examiner

Primary Examiner — Robert D Harlan
(74) Attorney, Agent, or Firm — Caesar Rivise, PC

(57) ABSTRACT

Provided is a method for producing a polyvinyl alcohol having improved mechanical strength without significantly impairing productivity. A method for producing a polyvinyl alcohol having an average degree of polymerization of $5.0 \times 10^3$ or more and $1.5 \times 10^4$ or less, the method including steps of: subjecting a vinyl ester-based monomer to suspension polymerization at a polymerization temperature of 10° C. or more and 50° C. or less with a polymerization rate of 10% or more and 70% or less to obtain a vinyl ester-based polymer; dissolving the vinyl ester-based polymer in an alcohol-based solvent; and carrying out a saponification reaction by adding a saponification catalyst to an alcohol-based solution of the dissolved vinyl ester-based polymer.

11 Claims, No Drawings

METHOD FOR PRODUCING POLYVINYL ALCOHOL

CROSS-REFERENCE TO RELATED APPLICATIONS

This application is a U.S. National Phase Application of PCT/JP2019/026528, filed Jul. 3, 2019, which claims priority to JP 2018-141717, filed Jul. 27, 2018, the contents of which applications are incorporated herein by reference in their entireties for all purposes.

FIELD OF THE INVENTION

The present invention relates to a method for producing a polyvinyl alcohol having a high degree of polymerization.

BACKGROUND OF THE INVENTION

Polyvinyl alcohol is widely used as a raw material for vinylon fibers, water-soluble films, raw material films for polarizing films, sizing agents for paper, sizing agents for fibers, adhesives, dispersants for suspension polymerization, dispersants for emulsion polymerization, and the like.

The polyvinyl alcohol having a high degree of polymerization is known to be produced by a method of suspension polymerization at a low temperature of 20° C. or less and at a polymerization rate of 10%/hour or less (Patent Literature 1), a method of emulsion polymerization at 15° C. or less using a specific emulsifier (Patent Literature 2), and a method of photoemulsification polymerization at 10° C. or less (Patent Literature 3).

CITATION LIST

Patent Literatures

[Patent Literature 1] Japanese Patent Application Publication No. S61-148209 A
[Patent Literature 2] Japanese Patent Application Publication No. S63-37106 A
[Patent Literature 3] Japanese Patent Application Publication No. S63-284206 A

Non-Patent Literature

[Non-Patent Literature 1] "Poval", co-authored by Nagano, Yamane and Toyoshima, Polymer Publishing Association (1981), Revised New Edition, pp. 105-107

SUMMARY OF THE INVENTION

Technical Problem

However, these methods have problems such as significantly poor productivity and insufficient mechanical strength of the obtained polyvinyl alcohol.

An object of the present invention is to provide a method for producing a polyvinyl alcohol having an excellent mechanical strength without significantly impairing productivity.

Solution to Problem

The above object is achieved by the present invention illustrated in the following aspects [1] to [11]:

[1]

A method for producing a polyvinyl alcohol having an average degree of polymerization of $5.0 \times 10^3$ or more and $1.5 \times 10^4$ or less, the method comprising steps of:

subjecting a vinyl ester-based monomer to suspension polymerization at a polymerization temperature of 10° C. or more and 50° C. or less with a polymerization rate of 10% or more and 70% or less to obtain a vinyl ester-based polymer;

dissolving the vinyl ester-based polymer in an alcohol-based solvent; and carrying out a saponification reaction by adding a saponification catalyst to an alcohol-based solution of the dissolved vinyl ester-based polymer.

[2]

The method for producing a polyvinyl alcohol according to [1], wherein a polymerization temperature (T) and a polymerization rate (X) of the vinyl ester-based monomer in the suspension polymerization are set so as to satisfy a following equation (1):

$$X \leq -0.05T^2 + 1.5T + 60 \qquad \text{Equation (1)}$$

in which equation (1), the symbol T represents a polymerization temperature (° C.), and the symbol X represents a polymerization rate (% by mass) (0<X<100).

[3]

The method for producing a polyvinyl alcohol according to [1] or [2], wherein the vinyl ester-based polymer used in the step of dissolving the vinyl ester-based polymer in the alcohol-based solvent has a median diameter of from 100 to 800 μm.

[4]

The method for producing a polyvinyl alcohol according to any one of [1] to [3], wherein the suspension polymerization comprises a step of adding a modified polyvinyl alcohol having a structure represented by a following chemical formula I:

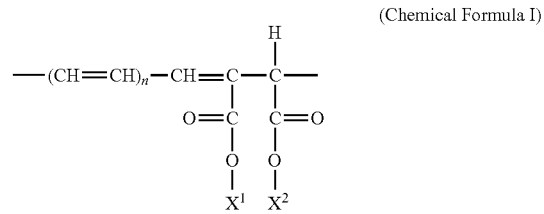

(Chemical Formula I)

in which chemical formula I, n represents an integer of 0 or more and 3 or less, and $X^1$ and $X^2$ each independently represent an alkyl group having 1 to 12 carbon atoms, a hydrogen atom or a metal atom.

[5]

The method for producing a polyvinyl alcohol according to any one of [1] to [4], wherein the vinyl ester-based polymer used in the step of dissolving the vinyl ester-based polymer in the alcohol-based solvent has a CV value of from 0.4 to 0.9, the CV value (σ50/d50×100) being calculated form a standard deviation (σ50) based on a median diameter (d50), the standard deviation being measured from a particle size distribution on volume basis as measured by a laser diffraction/scattering particle size distribution measurement method.

[6]

The method for producing a polyvinyl alcohol according to any one of [1] to [5], wherein the suspension polymerization comprises a step of adding a polymerization terminator to stop the polymerization of the vinyl ester-based monomer.

[7]
The method for producing a polyvinyl alcohol according to [6], wherein the polymerization terminator comprises a compound having a structure represented by the following chemical formula II:

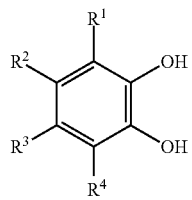

(Chemical Formula II)

in which chemical formula II, $R^1$, $R^2$, $R^3$ and $R^4$ each independently represent a hydrogen atom; a lower alkyl group having 1 to 8 carbon atoms; a lower alkyl group having 1 to 8 carbon atoms, a lower alkyl group having 1 to 8 carbon atoms with a carbonyl group and/or an amide group; or a halogen group.

[8]
The method for producing a polyvinyl alcohol according to [6], wherein the polymerization terminator comprises an unsaturated carboxylic acid compound having a conjugated diene structure represented by the following chemical formula

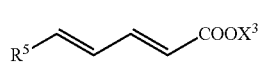

(Chemical Formula III)

in which formula III, $R^5$ represents a hydrogen atom; a lower alkyl group having 1 to 4 carbon atoms; a phenyl group; or an alkylphenyl group having a lower alkyl group having 1 to 4 carbon atoms; and $X^3$ represents an alkyl group having 1 to 8 carbon atoms; a hydrogen atom; or a metal atom.

[9]
The method for producing a polyvinyl alcohol according to [6], wherein the polymerization terminator comprises a nitroso compound.

[10]
The method for producing a polyvinyl alcohol according to any one of [6] to [9], comprising using an oxygen-containing gas as the polymerization terminator.

[11]
The method for producing a polyvinyl alcohol according to any one of [1] to [10], wherein the step of dissolving the vinyl ester-based polymer in the alcohol-based solvent comprises a step of adjusting a non-volatile component to 30 to 90% by mass.

Advantageous Effects of Invention

According to the present invention, it is possible to produce a polyvinyl alcohol having an excellent mechanical strength without significantly impairing productivity.

DETAILED DESCRIPTION OF THE INVENTION

In one embodiment of a method for producing a polyvinyl alcohol according to the present invention, a polyvinyl alcohol having an average degree of polymerization of $5.0 \times 10^3$ or more and $1.5 \times 10^4$ or less is produced by a production method including:

(A) subjecting a vinyl ester-based monomer to suspension polymerization at a polymerization temperature of from 10° C. to 50° C. and at a polymerization rate of from 10% to 70% to obtain a vinyl ester-based polymer (suspension polymerization step);

(B) dissolving the obtained vinyl ester-based polymer in an alcohol-based solvent; and (C) carrying out a saponification reaction by adding a saponification catalyst to an alcohol-based solution of the vinyl ester-based polymer dissolved in the previous step to produce a polyvinyl alcohol.

<Degree of Polymerization>

An average degree of polymerization of the polyvinyl alcohol produced according to the present invention is preferably $5.0 \times 10^3$ or more and $1.5 \times 10^4$ or less. By changing control ranges of the polymerization temperature and the polymerization rate, a polyvinyl alcohol that is outside the ranges may be produced. However, if the average degree of polymerization is less than $5.0 \times 10^3$, there is a drawback that a polyvinyl alcohol having an excellent mechanical strength as in the present invention may not be obtained. Further, even if the average degree of polymerization is more than $1.5 \times 10^4$, the effect of improving the mechanical strength is limited, and on the contrary, a drawback that the productivity is significantly decreased becomes more remarkable.

The average degree of polymerization can be controlled by adjusting the polymerization temperature, the polymerization rate, and a polymerization velocity (a change velocity of the polymerization rate per unit time). The average degree of polymerization can also be controlled by a method of polymerization in the presence of a small amount of a chain transfer agent.

The degree of polymerization as used herein refers to an average degree of polymerization measured by the method according to JIS K 6726: 1994. That is, the degree of polymerization is measured from an intrinsic viscosity [η] calculated from a relative density obtained by completely saponifying the vinyl ester-based polymer, purifying it, and then measuring the relative density in water at 30° C.

<Polymerization Rate>

The suspension polymerization of the vinyl ester-based monomer must be terminated in a polymerization rate of 10% by mass or more and 70% by mass or less. If the polymerization rate is less than 10% by mass, there is a drawback that the production efficiency is lower. Further, if the polymerization rate is more than 70% by mass, there are problems that the solubility of the resulting vinyl ester-based polymer in the alcohol-based solvent is decreased to deteriorate the productivity, and further, the mechanical strength of the resulting polyvinyl alcohol is decreased. The lower limit of the polymerization rate is preferably 20% by mass or more, and more preferably 30% by mass or more. The upper limit of the polymerization rate is preferably 60% by mass or less. In this case, the effect of the present invention can be further improved by setting a relationship between the polymerization temperature (T) and the polymerization rate (X) of the vinyl ester-based monomer in the suspension polymerization step (A) so as to satisfy the following equation (1). In view of a balance between the mechanical strength and the productivity of the resulting polyvinyl alcohol, the polymerization temperature is more preferably between 20 and 40° C., and even more preferably between 25 and 35° C.

$$X \leq -0.05T^2 + 1.5T + 60 \qquad \text{Equation (1)}$$

In the equation 1, T represents the polymerization temperature (° C.) and X represents the polymerization rate (% by mass) (0<X<100).

When it is outside the equation (1), the solubility of the vinyl ester-based polymer in the alcohol-based solvent is decreased. The decrease in the solubility as used herein refers to a longer dissolution time of the vinyl ester-based polymer in the alcohol-based solvent and/or an increase in an undissolved amount of the vinyl ester-based polymer during dissolution in the alcohol-based solvent. Further, when it is outside the equation (1), it causes a decrease in the productivity, meaning that an amount of undissolved deposits onto a polymerization can after the end of the polymerization is increased.

It should be noted that the polymerization rate as used herein refers to a ratio of the vinyl ester-based monomers that have reacted to the polymer, among the vinyl ester-based monomers used for the polymerization, and is expressed by "% by mass". As used herein, the polymerization rate refers to a value measured by a polymer concentration measuring method. That is, the polymerization rate is measured by sampling a polymerization solution during polymerization to measure its weight, calculating a polymer concentration of the polymerization solution based on the weight of the polymer obtained by distilling off the monomers and the solvent to measure an amount of the polymer relative to the monomers.

<Monomer>

The vinyl ester-based monomer used in the present invention may be used alone or in combination of a plurality of types of monomers, but the use of the vinyl ester monomer alone is recommended because of the convenience of work or the like. Examples of the vinyl ester-based monomer include vinyl formate, vinyl acetate, vinyl propionate, vinyl valerate, vinyl caprate, vinyl laurate, vinyl stearate, vinyl benzoate, vinyl pivalate and the like. From the viewpoint of easy polymerization, easy availability, or the like, vinyl acetate is preferably used.

In the present invention, monomers other than the vinyl ester-based monomer, such as those copolymerizable with the vinyl ester-based monomer, may also be used as long as the effect of the present invention is not impaired. Examples of such monomers include α-olefinic monomers such as ethylene and propylene; alkyl (meth)acrylate monomers such as methyl (meth)acrylate, ethyl (meth)acrylate, butyl (meth)acrylate and 2-ethylhexyl (meth) acrylate; unsaturated amide monomers such as (meth)acrylamide and N-methylol acrylamide; unsaturated carboxylic acid monomers such as (meth)acrylic acid, crotonic acid, maleic acid, itaconic acid, and fumaric acid; alkyl (methyl, ethyl, propyl, etc.) ester monomers of unsaturated carboxylic acids; anhydrides of unsaturated carboxylic acids such as maleic anhydride; salts of unsaturated carboxylic acids with sodium, potassium, ammonium, and the like; glycidyl group-containing monomers such as allyl glycidyl ether, and glycidyl (meth)acrylate; sulfonic acid group-containing monomers such as 2-acrylamide-2-methylpropanesulfonic acid or salts thereof; phosphoric acid group-containing monomers such as acid phosphoxyethyl methacrylate and acid phosphoxypropyl methacrylate; and alkyl vinyl ether monomers. From the viewpoint of sufficiently exerting the effects of the present invention, an amount of the monomer other than the vinyl ester-based monomer is preferably 5 mol % or less, and more preferably 2 mol % or less, and even more preferably 1 mol % or less relative to the vinyl ester-based monomer.

<Polymerization Initiator>

A polymerization initiator for suspension polymerization of the vinyl ester-based monomer includes, but not particularly limited to, azo compounds such as azobisisobutyronitrile, azobis-2,4-dimethylvaleronitrile, azobis(4-methoxy-2, 4-dimethylvaleronitrile), azobisdimethylvaleronitrile and azobismethoxyvaleronitrile; peroxides such as acetyl peroxide, benzoyl peroxide, lauroyl peroxide, acetylcyclohexylsulfonyl peroxide and 2,4,4-trimethylpentyl-2-peroxyphenoxyacetate; percarbonate compounds such as diisopropylperoxydicarbonate, di-2-ethylhexylperoxydicarbonate, and diethoxyethylperoxydicarbonate; perester compounds such as t-butylperoxyneodecanate and α-cumylperoxyneodecanate, which can be used alone or in combination with one another. In the present invention, azobis(4-methoxy-2,4-dimethylvaleronitrile) is preferably used because polymerization proceeds at a lower temperature.

<Particle Size Distribution of Vinyl Ester-Based Polymer>

Vinyl ester-based polymer particles obtained by suspension polymerization are preferably adjusted to have a median diameter of from 100 to 800 μm. The median diameter is more preferably from 150 to 500 μm, and still more preferably from 200 to 400 μm. The adjustment of the median diameter to the above range can allow the suspended particles during polymerization to be stabilized and a dissolution work during dissolving of the vinyl ester-based polymer in the alcohol-based solvent in the next step to be easier.

The median diameter of the vinyl ester-based polymer particles can be controlled by adjusting a stirring power of a reaction can, and a type and amount of a dispersant used. In general, as the stirring power increases and the amount of dispersant added increases, the median diameter decreases. The median diameter can also be controlled by performing a particle size sorting step such as sieving of the vinyl ester-based polymer particles.

In the present invention, the median diameter (d50) of the vinyl ester-based polymer particles is determined by measuring a cumulative particle size distribution on volume basis by a laser diffraction/scattering particle size distribution measurement method.

For the vinyl ester-based polymer particles, a standard deviation (σ50) based on a median diameter (d50) is measured from the particle size distribution on volume basis, which is measured by the laser diffraction/scattering particle size distribution measurement method, and a CV value (σ50/d50×100) is calculated. The CV value is preferably 2.0 or less. The CV value of 2.0 or less means that the particle size distribution is narrow. A higher content of fine particles causes a problem of decreasing an efficiency of monomer removal. Also, a higher content of coarse particles causes a problem of affecting the solubility in the alcohol-based solvent. The CV value can preferably be 1.5 or less, and more preferably 1.0 or less, and still more preferably from 0.4 to 0.9, for example, from 0.2 to 2.0.

<Dispersant>

The dispersant used in the suspension polymerization is not particularly limited, and commonly used polyvinyl alcohol-based dispersants, cellulosic dispersants, polyvinylpyrrolidone, acrylic acid or salts thereof, methacrylic acid or salts thereof, poly(meth)acrylamides and the like can be used. In view of the dispersion stability during the suspension polymerization and finally produced polyvinyl alcohol, the polyvinyl alcohol-based dispersants, in particular, a modified polyvinyl alcohol having a structural unit represented by the following chemical formula I is preferably used. The use of the modified polyvinyl alcohol can allow the dispersion stability to be maintained by adding a small amount of the modified polyvinyl alcohol (1000 ppm/monomer). The modified polyvinyl alcohol is known in the art and is described, for example, in Japanese Patent Application Publication No. 2010-202840 A, Japanese Patent Application Publication No. 2014-31487 A and Japanese Patent Application Publication No. 2015-187215 A.

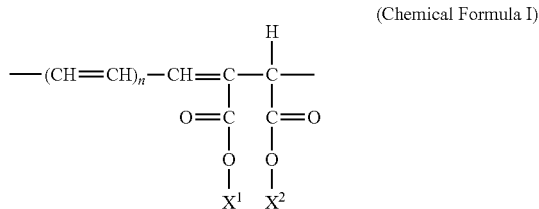
(Chemical Formula I)

In the chemical formula I, $X^1$ and $X^2$ each independently represent an alkyl group having 1 to 12 carbon atoms, a hydrogen atom or a metal atom, and n represents an integer of from 0 to 3. Among the alkyl groups having 1 to 12 carbon atoms, lower alcohols having 1 to 2 carbon atoms are preferable because those having a smaller number of carbon atoms have lower viscosity and are easier to handle, and their raw materials are inexpensive. As the metal atom, alkali metals and alkaline earth metals are preferable.

<Polymerization Terminator>

As described above, it is essential to stop the suspension polymerization of the vinyl ester-based monomer at a polymerization rate of from 10 to 70%. It is possible to stop the polymerization by decreasing a temperature of the reaction solution to a temperature lower than the reaction temperature. However, the polymerization is preferably stopped with a polymerization terminator in order to control the polymerization rate reliably. The polymerization terminator that can be used in this case includes, but not particularly limited to, a compound having a catechol structure represented by the following chemical formula II, a compound having a conjugated diene structure represented by the following chemical formula III, a compound having a nitroso structure, and oxygen-containing gas (e.g., air, oxygen). These may be used alone or in combination of two or more. When air or oxygen is used, it is more preferable to dilute it with an inert gas such as nitrogen for safety reasons.

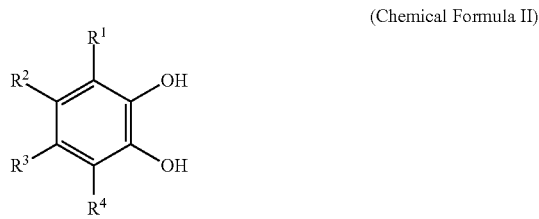
(Chemical Formula II)

In the chemical formula II, $R^1$, $R^2$, $R^3$ and $R^4$ each independently represent a hydrogen atom; a lower alkyl group having 1 to 8 carbon atoms; a lower alkyl group having 1 to 8 carbon atoms with a carbonyl group and/or an amide group; or a halogen group.

Among the lower alkyl groups having 1 to 8 carbon atoms, bulky groups such as a tert-butyl group, an isobutyl group and an isopropyl group is more preferable from the viewpoint of the polymerization termination effect, and thus, a carbon number of 3 or more is preferable.

Specific examples of the compound having the catechol structure represented by Chemical Formula II include 4-tert-butylcatechol and the like.

(Chemical Formula III)

In the chemical formula III, $R^5$ represents a hydrogen atom; a lower alkyl group having 1 to 4 carbon atoms; a phenyl group; or an alkylphenyl group having a lower alkyl group having 1 to 4 carbon atoms; and $X^3$ represents an alkyl group having 1 to 8 carbon atoms; a hydrogen atom; or a metal atom.

Among the lower alkyl groups having 1 to 4 carbon atoms, an alkyl group having one carbon is preferable because it has a higher polymerization termination effect and its raw material is inexpensive. Among the alkylphenyl groups, an alkylphenyl group having a lower alkyl group having 1 to 4 carbon atoms is preferable because a smaller number of carbon atoms leads to a lower viscosity and is easier to handle. Specific examples of the unsaturated carboxylic acid compound having the conjugated diene structure represented by the chemical formula III include sorbic acid and the like.

Specific examples of the compound having the nitroso structure include cupferron and the like.

The use of these polymerization terminators can allow the polymerization to be reliably terminated and the resulting polyvinyl alcohol to be prevented from being colored. The added amount of the polymerization terminator is preferably 1-fold molar or more and 3-fold molar or less with respect to a molar amount of the polymerization initiator. If it is less than 1-fold molar, the polymerization may not be stopped, and if it is more than 3-fold molar, the polymerization terminator remains as an impurity in the system. Further, it remains in the polymerization can and has an influence on a polymerization reaction in the next step.

<Monomer Removal>

After stopping the polymerization, monomer removal is carried out to remove unreacted vinyl ester-based monomers. A method of monomer removal is not particularly limited, and any method may be adopted. A method of distilling off the unreacted monomers out of the system while heating the reaction solution under a reduced pressure is convenient and is recommended.

A vinyl ester-based polymer can be obtained by filtering and drying the reaction solution from which the unreacted monomers have been removed. Although it is possible to omit the drying step and subject it to the next dissolution step, it is recommended to subject it to the dissolution step after drying, because it is difficult to control a saponification reaction due to a variation in water content.

<Saponification>

The vinyl ester-based polymer obtained by the suspension polymerization is dissolved in an alcohol-based solvent. Examples of the alcohol-based solvent used in this case include methanol, ethanol, butanol and the like, and the use of methanol is preferable. A concentration of the polymer (non-volatile component) in the alcohol-based solvent is preferably in a range of from 30 to 90% by mass, and more preferably from 40 to 88% by mass, and even more preferably from 50 to 85% by mass. The non-volatile component concentration in the above range can provide an advantage that the polyvinyl alcohol particles obtained by saponification become finer. The amount of the non-volatile component is calculated from the weight of the solid content remaining after drying the alcohol-based solution of the vinyl ester polymer at 150° C. for 30 minutes.

A dissolving apparatus is not particularly limited, and can employ various dissolving cans. When it is desired to increase the concentration of the polymer, it is recommended using a kneader type kneading machine as the dissolving can. The use of the kneader type kneading machine enables stirring even if a solution viscosity becomes high, and allows a time required for dissolution to be shortened.

The saponification reaction is carried out by adding an alkali catalyst or an acid catalyst to the alcohol-based solution of the vinyl ester-based polymer. Examples of the alkali catalyst that can be used include alkali catalysts such as hydroxides and alcoholates of alkali metals, for example, sodium hydroxide, potassium hydroxide, sodium methylate, sodium ethylate, and potassium methylate. The saponification can also be carried out using an acid catalyst in place of an alkali catalyst. Examples of the acid catalyst that can be used include aqueous inorganic acid solutions such as hydrochloric acid and sulfuric acid, and organic acids such as p-toluenesulfonic acid. The amount of the alkali catalyst or acid catalyst used should be from 1 to 100 mmol equivalent with respect to the vinyl ester-based monomer.

A temperature of the saponification reaction is not particularly limited, but is typically in a range of from 10 to 70° C., and preferably selected from a range of from 30 to 50° C. The reaction is typically carried out over a period of 15 to 180 minutes.

A reactor that can be used for the saponification includes, but not particularly limited to, standard methods such as continuous type reactors such as single-screw type, horizontal biaxial type, rotary plate type, vertical biaxial multistage stirring blade type, belt type, pipe type, and slurry type reactors, and batch type reactors using a kneader type kneading machine (see Non-Patent Literature 1).

When the kneader type kneading machine is used in the dissolving step, it is convenient to continue to carry out it to the saponification reaction in the kneader type kneading machine (Non-Patent Literature 1).

A degree of saponification of the polyvinyl alcohol having a high degree of polymerization according to the present invention is not particularly limited. It is selected depending on the purposes. For example, when the polyvinyl alcohol is produced for water-soluble films and adhesives, the degree of saponification can be set to 65 to 95 mol %, and when it is produced for raw material films for polarizing films and binders for non-woven fabrics produced from glass fibers, the degree of saponification can be set to 98.0 mol % or more. The degree of saponification is measured in accordance with JIS K 6726: 1994. That is, the degree of saponification can be measured by quantifying a residual acetic acid group (mol %) in a sample with sodium hydroxide and subtracting it from 100.

The polyvinyl alcohol produced according to the present invention has an excellent productivity and mechanical strength, and can be used for various applications such as vinylon fibers, water-soluble films, raw material films for polarizing films, sizing agents for paper, sizing agents for fibers, adhesives, dispersants for suspension polymerization, dispersants for emulsion polymerization, and raw materials for polybutyral resins.

EXAMPLES

While the present invention will be specifically described based on Examples below, the present invention is not limited thereto. Unless otherwise specified, "parts" and "%" mean "parts by mass" and "% by mass", respectively.

Further, physical properties of vinyl acetate resins and polyvinyl alcohols obtained in Examples were determined by methods as described below.

<Median Diameter of Vinyl Acetate Resin>

The median diameter (d50) of the resulting vinyl acetate resin was measured by using a laser diffraction type particle size distribution measuring device SALD-3000S available from Shimadzu Corporation, and adding distilled water to a measurement cell.

<Particle Size Distribution (CV Value) of Vinyl Acetate Resin>

For the particle size distribution, a median diameter (d50) on volume basis and a standard deviation ($\sigma$50) based on the d50 were measured using a laser diffraction type particle size distribution measuring device SALD-3000 S (available from Shimadzu Corporation) to calculate a CV value ($\sigma$50/d50× 100). A smaller CV value indicates a narrower particle size distribution.

<Evaluation of Solubility>

The solubility of the vinyl ester polymer in the alcohol-based solvent was evaluated as good ($\bigcirc$, a single circle) for an amount of undissolved substance of 1000 ppm by mass or less, and as poor (x) for an amount of undissolved substance of more than 1000 ppm by mass. The amount of undissolved substance was measured by the following procedure. To 30 g of the vinyl acetate resin was added 800 mL of methanol, and dissolved with an anchor blade stirrer at a rotation speed of 300 rpm for 3 hours. The solution was then filtered using a filter cloth having 150 mesh (available from Hagitech Inc., nylon 66PA screen, 150 mesh, product number N-150T, an opening of 108 μm, a wire diameter of 61 μm), and the amount of undissolved substance was measured from the mass of the solid content remaining on the filter cloth.

<Evaluation of Adhesion>

The evaluation of the adhesion was carried out by visually evaluating whether or not there were insoluble deposits in the alcohol-based solvent in the polymerization can after stopping the reaction of the vinyl ester-based polymer and removing the unreacted vinyl ester monomers. A case where such deposits were not present in the polymerization can was evaluated as good ($\bigcirc$, a single circle), and a case where such deposits were present was evaluated as poor (x).

<Average Degree of Polymerization of Vinyl Acetate Resin (PAc)>

The average degree of polymerization was measured in accordance with "3.2 Average Degree of Polymerization" of "Testing Method for Polyvinyl Acetate" in JIS K 6725-1977.

<Average Degree of Polymerization of Polyvinyl Alcohol (PA)>

The average degree of polymerization was measured by a method according to JIS K 6726: 1994. That is, the average degree of the polymerization was measured by completely saponifying the polyvinyl alcohol, purifying it, and then measuring the intrinsic viscosity [η] in water at 30° C.

<Tensile Strength>

After dissolving the polyvinyl alcohol in pure water and removing foreign substances with a pressure filtration device (KST-90-UH available from Advantech), the above aqueous polyvinyl alcohol-based solution was cast on a polyethylene terephthalate film using an applicator, dried, and then peeled off from the polyethylene terephthalate film to obtain a film having a thickness of 15.0±1.0 μm. The polyvinyl alcohol film was room-conditioned at 20° C. and 60% RH for 2 days, and a tensile test was then carried out. The tensile test was carried out using AG-X (available from Shimadzu Corporation) under conditions of a film sample width of 9.0 mm, a gripping tool distance of 90.0 mm, and a tensile speed of 50 mm/min.

Example 1: Suspension Polymerization

To a polymerization can equipped with a reflux condenser, a dropping funnel, and a stirrer were added 100 parts by mass of vinyl acetate monomer and 120 parts by mass of water, and nitrogen was blown for 1 hour to perform deoxidation. Subsequently, 0.018 parts by mass of V-70 (azobis(4-methoxy-2,4-dimethylvaleronitrile)) as an initiator and 0.1 parts by mass of dimethyl maleate-modified PVA as a dispersant were charged, and polymerized at 15° C. As a polymerization rate of the vinyl acetate resin reached about 30%, t-butylcatechol, a polymerization terminator, was added in an amount of 2.0-fold molar with respect to the initiator to stop the reaction (a polymerization rate when the reaction was stopped was 30%).

After the end of the polymerization reaction, the vessel was sealed, and the unreacted monomers were removed at 70° C. for 3 hours with stirring while maintaining the interior of the vessel under reduced pressure. The resulting vinyl acetate resin slurry was subjected to treatments of cooling, filtration, washing with water, dehydration, drying and the like to obtain a granular vinyl acetate resin having an average degree of polymerization of 18,500.

To a kneader type kneading machine (a capacity of 10 liters) was added 2200 g of methanol, to which 500 g of the vinyl acetate resin obtained above (a concentration of non-volatile component=81.5%) was gradually added. Stirring was continued for 180 minutes to dissolve the vinyl acetate resin completely.

A solution of 10% sodium hydroxide in methanol was added thereto (0.03 parts by mass of sodium hydroxide with respect to 100 parts by mass of vinyl acetate), and a saponification reaction was carried out at 30° C. for 160 minutes. After neutralization with acetic acid, the resulting solid content was heated and dried to obtain a polyvinyl alcohol having a degree of saponification of 99.4 mol % and an average degree of polymerization of 11,800.

A film was prepared from the polyvinyl alcohol obtained above by the method described above and a tensile test was conducted to measure the tensile strength. As a result, the tensile strength of the film was 72.2 N/mm².

These results are summarized in Table 1.

Examples 2 to 8: Suspension Polymerization

Polymerization and saponification were carried out in the same manner as those of Example 1, with the exception that the polymerization temperature and the polymerization rate were changed as shown in Table 1, and the resulting polyvinyl alcohol film was then prepared. Table 1 shows the results of the same physical property evaluations as those of Example 1.

Comparative Examples 1 to 5: Suspension Polymerization

Polymerization and saponification were carried out in the same manner as those of Example 1, with the exception that the polymerization temperature and the polymerization rate were changed as shown in Table 1, and the resulting polyvinyl alcohol film was then prepared. Table 1 shows the results of the same physical property evaluations as those of Example 1.

Comparative Example 6: Solution Polymerization

To a polymerization can equipped with a reflux condenser, a dropping funnel, and a stirrer were added 100 parts by mass of vinyl acetate monomer, 14.3 parts by mass of methanol, and 20 ppm by mass of azobisisobutyronitrile as a polymerization initiator with respect to vinyl acetate, and polymerization was carried out at an outside temperature of 65° C. for 8 hours with stirring under a nitrogen stream. As the polymerization rate reached 56%, a methanol vapor was blown into the polymerization reaction solution to remove unreacted monomers, and then diluted with methanol to prepare a solution of vinyl acetate resin in methanol, thereby obtaining a methanol solution of vinyl acetate resin having an average degree of polymerization of 3,300.

To the methanol solution of the vinyl acetate resin obtained above was added a solution of sodium hydroxide in methanol, and a saponification reaction was carried out at 40° C. for 45 minutes. The resulting saponification reaction solution was heated and dried to obtain a polyvinyl alcohol (PVA) having a saponification degree of 99.1 mol % and an average degree of polymerization of 2,450.

Table 1 shows the results of the film prepared in the same procedure as that of Example 1 from the PVA obtained above and the same physical property evaluations as those of Example 1.

Comparative Example 7: Solution Polymerization

To a polymerization can equipped with a reflux condenser, a dropping funnel, and a stirrer were added 100 parts by mass of vinyl acetate monomer, 8.2 parts by mass of methanol, and 12 ppm by mass of azobisisobutyronitrile as a polymerization initiator with respect to vinyl acetate, and polymerization was carried out at an outside temperature of 65° C. for 8 hours with stirring under a nitrogen stream. As the polymerization rate reached 40%, a methanol vapor was blown into the polymerization reaction solution to remove unreacted monomers, and then diluted with methanol to prepare a solution of vinyl acetate resin in methanol, thereby obtaining a methanol solution of vinyl acetate having an average degree of polymerization of 4,150.

To the methanol solution of the vinyl acetate resin obtained above was added a solution of sodium hydroxide in methanol, and a saponification reaction was carried out at 40° C. for 45 minutes. The resulting saponification reaction solution was heated and dried to obtain PVA having a saponification degree of 99 mol % and an average degree of polymerization of 3,050.

Table 1 shows the results of the film prepared in the same procedure as that of Example 1 from the PVA obtained above and the same physical property evaluations as those of Example 1.

TABLE 1

| | Polymerization Temperature (° C.) | Polymerization Rate (%) | Equation (1)*1 | Median Diameter (μm) | CV Value | Solubility | Adhesion | PAc | PA | Degree of Saponification (mol %) | Tensile Strength (N/mm²) |
|---|---|---|---|---|---|---|---|---|---|---|---|
| Example 1 | 15 | 30 | 71.3 | 265 | 0.4 | ○ | ○ | 18500 | 11800 | 99.4 | 72.2 |
| Example 2 | 20 | 30 | 70 | 255 | 0.5 | ○ | ○ | 16000 | 10200 | 99.3 | 71.4 |
| Example 3 | 25 | 51 | 66.3 | 260 | 0.6 | ○ | ○ | 18800 | 8800 | 99.3 | 64.9 |
| Example 4 | 30 | 52 | 60 | 165 | 0.7 | ○ | ○ | 15780 | 8170 | 99.3 | 63.7 |
| Example 5 | 35 | 32 | 51.3 | 358 | 0.6 | ○ | ○ | 10800 | 7580 | 99.2 | 64 |
| Example 6 | 40 | 18 | 40 | 384 | 0.7 | ○ | ○ | 10350 | 7920 | 99.4 | 65.5 |
| Example 7 | 40 | 33 | 40 | 335 | 0.9 | ○ | ○ | 11400 | 7600 | 99.2 | 64.4 |
| Example 8 | 40 | 69 | 40 | 187 | 1.2 | ○ | ○ | 17000 | 6000 | 99.1 | 57.2 |
| Comparative Example 1 | 25 | 90 | 86.3 | 324 | 1.1 | x | x | 40000 | 7400 | 99.1 | 57.1 |
| Comparative Example 2 | 30 | 89 | 60 | 311 | 1.2 | x | x | 39000 | 6700 | 99.1 | 55.1 |
| Comparative Example 3 | 45 | 93 | 26.3 | 200 | 1.5 | x | x | 25670 | 4660 | 99 | 51.1 |
| Comparative Example 4 | 50 | 93 | 10 | 116 | 1.7 | x | x | 22860 | 4140 | 99 | 50.7 |
| Comparative Example 5 | 65 | 56 | −53.8 | — | — | — | — | 3300 | 2450 | 99.1 | 45.2 |
| Comparative Example 6 | 65 | 40 | −53.8 | — | — | — | — | 4150 | 3050 | 99 | 48.5 |

*1 $-0.05T^2 + 1.5T + 60$ (Evaluation of Polymerization Terminator)

The polymerization terminators were evaluated by adding each polymerization terminator to a polymerization system during polymerization, and then cooling it at 20° C. for 16 hours, and comparing a polymerization rate $P_1$ of vinyl acetate before the addition of the polymerization terminator with a polymerization rate $P_2$ of vinyl acetate after the addition of the polymerization terminator. A polymerization terminator in which an increase in the polymerization rate ($P_2-P_1$) of vinyl acetate after cooling at 20° C. for 16 hours from the addition of the polymerization terminator was within 5% was evaluated as good "○, a single circle", and a polymerization terminator in which the above increase was more than 5% was evaluated as poor "x".

Experimental Example A: Suspension Polymerization

To a polymerization can equipped with a reflux condenser, a dropping funnel, and a stirrer were added 100 parts by mass of vinyl acetate monomer and 120 parts by mass of water, and nitrogen was blown for 1 hour to perform deoxidation. Subsequently, 0.018 parts by mass of V-70 as an initiator and 0.1 parts by mass of dimethyl maleate-modified PVA as a dispersant were charged and polymerized at 30° C. As the polymerization rate of the vinyl acetate resin reached 27%, t-butylcatechol (TBC), a polymerization terminator, was added in parts by mass as shown in Table 2 to stop the reaction. This was then cooled to 20° C. and allowed to stand for 16 hours before measuring the polymerization rate. As a result, the polymerization rate was 28%. The evaluation of the polymerization terminator is shown in Table 2.

Experimental Examples B to C

The polymerization was carried out in the same manner as that of Experimental Example A, with the exception that the polymerization temperature, the polymerization rate, the type and the addition amount of the polymerization terminator were changed as shown in Table 2, and the polymerization terminator were evaluated.

Experimental Example D

To a polymerization can equipped with a reflux condenser, a dropping funnel, and a stirrer were added 100 parts by mass of vinyl acetate monomer and 120 parts by mass of water, and nitrogen was blown for 1 hour to perform deoxidation. Subsequently, 0.018 parts by mass of V-70 as an initiator and 0.1 parts by mass of dimethyl maleate-modified PVA as a dispersant were charged and polymerized at 30° C. As the polymerization rate of the vinyl acetate resin reached 38%, air (60 mL/min) was added for 30 minutes to stop the reaction. Here, a flow rate of oxygen was adjusted such that an oxygen concentration in the gas phase in the polymerization system did not exceed 9%. This was then cooled to 20° C. and allowed to stand for 16 hours before the polymerization rate was measured. As a result, the polymerization rate was 40%.

Experimental Examples E and F: Comparison

The polymerization was carried out in the same manner as that of Experimental Example A, with the exception that the polymerization temperature, the polymerization rate, the type and the addition amount of the polymerization terminator were changed as shown in Table 2, and the polymerization terminators were evaluated.

TABLE 2

|  | Types of Polymerization Inhibitors | Inhibitor (Parts by Mass/ Molar Ratio to Initiator) | Polymerization Temperature (° C.) | Polymerization Rate (%) At End of Polymerization | Polymerization Rate (%) After Cooling for 16 hours | Evaluation of Polymerization Inhibitor |
|---|---|---|---|---|---|---|
| Exp. Example A | TBC*1 | 0.020/2.06 | 30 | 27 | 28 | ○ |
| Exp. Example B | Sorbic Acid | 0.014/2.14 | 30 | 29 | 30 | ○ |
| Exp. Example C | Cupferron | 0.027/2.98 | 40 | 33 | 34 | ○ |
| Exp. Example D | Air | — | 30 | 38 | 40 | ○ |
| Exp. Example E (Comparison) | BHT*2 | 0.027/2.78 | 30 | 35 | 47 | x |
| Exp. Example F (Comparison) | DTBP*3 | 0.025/1.94 | 30 | 34 | 65 | x |

*1TBC: t-butylcatechol
*2BHT: 3,5-di-tert-butyl-4-hydroxytoluene
*3DTBP: di-tert-butylphenol (Study for Effect of Saponification conditions on Particle Size of Polyvinyl Alcohol)

Example α

A vinyl acetate resin (average degree of polymerization: 16,000) and methanol were added to a kneader type kneading machine (a capacity of 10 liters) such that a non-volatile component was 89.0%, and stirring was continued for 180 minutes to dissolve the vinyl acetate resin completely.

A solution of 10% sodium hydroxide in methanol was added thereto (0.03 parts by mass of sodium hydroxide with respect to 100 parts by mass of vinyl acetate), and a saponification reaction was carried out at 30° C. for 160 minutes. After neutralization with acetic acid, the resulting solid content was heated and dried to obtain a polyvinyl alcohol having a saponification degree of 99 mol % and an average degree of polymerization of 10,200.

The obtained polyvinyl alcohol was subjected to a metal sieve having a sieve opening of 1.7 mm according to the standard of a test sieve of JIS Z-8801-1 (2006)-Part 1: metal mesh sieve. As a result, an amount on the sieve was 26.0% by mass.

Examples β to δ

Saponification was carried out in the same manner as that of Example α, with the exception that the average degree of polymerization of the vinyl acetate resin used and the concentration of the vinyl acetate resin with respect to methanol (non-volatile component) were changed as shown in Table 3, and the evaluation of the particle size of the obtained polyvinyl alcohol was carried out by evaluating the mass ratio of the substances remaining on the sieve using the same sieve as that of Example α.

Comparative Example ε

A vinyl acetate resin (an average degree of polymerization: 16,000) and methanol were added to a kneader type kneading machine (a capacity of 10 liters) such that a non-volatile component was 91.6%, and stirring was continued for 180 minutes to dissolve the vinyl acetate resin completely.

A solution of 10% sodium hydroxide in methanol was added thereto (0.03 parts by mass of sodium hydroxide with respect to 100 parts by mass of vinyl acetate), and a saponification reaction was carried out at 30° C. for 160 minutes. After neutralization with acetic acid, the resulting solid content was heated and dried to obtain a polyvinyl alcohol having a saponification degree of 99 mol % and an average degree of polymerization of 10,200. The obtained polyvinyl alcohol was subject to sieving with the same sieve as that of Example α. As a result, an amount of the substances remaining on the sieve was 92.0% by mass.

Comparative Example ζ

Saponification was carried out in the same manner as that of Comparative Example ε, with the exception that the non-volatile component concentration was changed as shown in Table 3, and the evaluation of the particle size of the obtained polyvinyl alcohol was carried out by evaluating the mass ratio of the substances remaining on the sieve using the same sieve as that of Example α.

TABLE 3

|  | Non-volatile Component (%) | PAc | PA | Amount on sieve [% by mass] |
|---|---|---|---|---|
| Example α | 89.0 | 16000 | 10200 | 26 |
| Example β | 85.0 | 16000 | 10200 | 24 |
| Example γ | 79.0 | 16000 | 10200 | 29 |
| Example δ | 50.0 | 10350 | 7920 | 34 |
| Comp. ε | 91.6 | 16000 | 10200 | 92 |
| Comp. ζ | 93.9 | 16000 | 10200 | 97 |

The invention claimed is:

1. A method for producing a polyvinyl alcohol having an average degree of polymerization of $5.0 \times 10^3$ or more and $1.5 \times 10^4$ or less, the method comprising steps of:
   subjecting a vinyl ester-based monomer to suspension polymerization at a polymerization temperature of 10° C. or more and 50° C. or less with a polymerization rate of 10% or more and 70% or less to obtain a vinyl ester-based polymer;
   dissolving the vinyl ester-based polymer in an alcohol-based solvent to provide an alcohol-based solution containing the vinyl ester-based polymer; and
   carrying out a saponification reaction by adding a saponification catalyst to the alcohol-based solution.

2. The method for producing a polyvinyl alcohol according to claim 1, wherein a polymerization temperature (T) and a polymerization rate (X) of the vinyl ester-based monomer in the suspension polymerization are set so as to satisfy a following equation (1):

$$X \leq -0.05T^2 + 1.5T + 60 \quad \text{Equation(1)}$$

in which equation (1), T represents a polymerization temperature (° C.), and X represents a polymerization rate (% by mass) (0<X<100).

3. The method for producing a polyvinyl alcohol according to claim 1, wherein the vinyl ester-based polymer used in the step of dissolving the vinyl ester-based polymer in the alcohol-based solvent has a median diameter of from 100 to 800 µm.

4. The method for producing a polyvinyl alcohol according to claim 1, wherein the suspension polymerization comprises a step of adding a modified polyvinyl alcohol having a structure represented by a following chemical formula I:

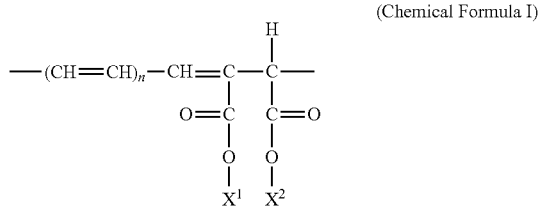

(Chemical Formula I)

in which chemical formula I, n represents an integer of 0 or more and 3 or less, and $X^1$ and $X^2$ each independently represent an alkyl group having 1 to 12 carbon atoms, a hydrogen atom or a metal atom.

5. The method for producing a polyvinyl alcohol according to claim 1, wherein the vinyl ester-based polymer used in the step of dissolving the vinyl ester-based polymer in the alcohol-based solvent has a CV value of from 0.4 to 0.9, the CV value (σ50/d50×100) being calculated from a standard deviation (σ50) based on a median diameter (d50), the standard deviation being measured from a particle size distribution on volume basis as measured by a laser diffraction/scattering particle size distribution measurement method.

6. The method for producing a polyvinyl alcohol according to claim 1, wherein the suspension polymerization comprises a step of adding a polymerization terminator to stop the polymerization of the vinyl ester-based monomer.

7. The method for producing a polyvinyl alcohol according to claim 6, wherein the polymerization terminator comprises a compound having a structure represented by the following chemical formula II:

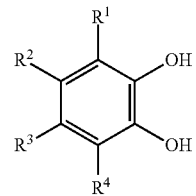

(Chemical Formula II)

in which chemical formula II, $R_1$, $R^2$, $R^3$ and $R^4$ each independently represent a hydrogen atom; a lower alkyl group having 1 to 8 carbon atoms; a lower alkyl group having 1 to 8 carbon atoms, a lower alkyl group having 1 to 8 carbon atoms with a carbonyl group and/or an amide group; or a halogen group.

8. The method for producing a polyvinyl alcohol according to claim 6, wherein the polymerization terminator comprises an unsaturated carboxylic acid compound having a conjugated diene structure represented by the following chemical formula III:

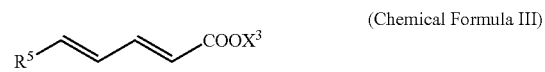

(Chemical Formula III)

in which formula III, $R^5$ represents a hydrogen atom; a lower alkyl group having 1 to 4 carbon atoms; a phenyl group; or an alkylphenyl group having a lower alkyl group having 1 to 4 carbon atoms; and $X^3$ represents an alkyl group having 1 to 8 carbon atoms; a hydrogen atom; or a metal atom.

9. The method for producing a polyvinyl alcohol according to claim 6, wherein the polymerization terminator comprises a nitroso compound.

10. The method for producing a polyvinyl alcohol according to claim 6, comprising using an oxygen-containing gas as the polymerization terminator.

11. The method for producing a polyvinyl alcohol according to claim 1, wherein the step of dissolving the vinyl ester-based polymer in the alcohol-based solvent comprises a step of adjusting a non-volatile component to 30 to 90% by mass.

* * * * *

UNITED STATES PATENT AND TRADEMARK OFFICE
CERTIFICATE OF CORRECTION

PATENT NO. : 11,365,268 B2
APPLICATION NO. : 17/057556
DATED : June 21, 2022
INVENTOR(S) : Akihiro Yamashita It is certified that error appears in the above-identified patent and that said Letters Patent is hereby corrected as shown below:

In the Claims

In Claim 7 at Column 18, Line 12, the wording "in which chemical formula II, $R_1$, $R^2$, $R^3$ and $R^4$ each" should read -- in which chemical formula II, $R^1$, $R^2$, $R^3$ and $R^4$ each --.

Signed and Sealed this
Eleventh Day of October, 2022

Katherine Kelly Vidal
*Director of the United States Patent and Trademark Office*